UNITED STATES PATENT OFFICE 2,508,978

EMULSOIDS

Talmadge B. Tribble, Evanston, Ill., assignor to Flavor Corporation of America, Chicago, Ill., a corporation of Delaware No Drawing. Application July 8, 1947,
Serial No. 759,713

13 Claims. (Cl. 99—140)

This invention relates to a method of solubilizing or emulsifying oleoresins and essential oils to give the maximum dispersion of these flavors in the processing of food products.

Much work has been done in the complex art of making water in oil emulsions. There are many recognized emulsifying agents, but the use of each one is limited because of definite incompatibilities with other ingredients, uneven dispersion of oil globules, destructibility in the presence of temperature variations, as well as many other disadvantages, depending upon the type of emulsifying agent used.

There are many known fatty acid esters used as emulsifiers. They have many disadvantages in use. Polyoxyalkylene derivative of hexitol anhydride ester with long chain fatty acids such as hexitol polyoxyethylene mono-fatty acid esters as herein referred to is an example of means and a method for reducing their disadvantages and thus producing practical and economical advantages. One manufacturer of these products recommends up to 85 per cent of these with 15 per cent of essential oil as a practical example of what is required to produce a suitable emulsion that will remain clear on dilution with water.

Aside from the relatively high cost, such a high dilution of these particular emulsifying agents produces two major disadvantages in their use as dispersing agents for flavor oils. The chief disadvantage is the pungent, bitter taste which some of these types of emulsifiers have and which is often imparted to the finished food product.

The other major disadvantage lies in the high degree of foaming properties found in this type of emulsifying agent. This renders it particularly impractical for soft drink bottlers and manufacturers of other types of bottled or liquid goods, such as condiments or canned goods, particularly where continuous agitation of the flavored brine is necessary as in the case of pickle packers.

An object of this invention is to provide a new emulsifier or solubilizer combination to reduce the amount of fatty acid esters normally required. The use of hexitol polyoxyethylene mono-fatty acid esters is given as an example. This invention is not limited to the use of these particular fatty acid esters, components of which include (1) polyhydric alcohols or isomers thereof, such as the mono-anhydrides (hexitans) and dianhydrides (hexides); (2) mono-fatty acid ester radical having six or more carbon atoms, such as the fatty acids which are present, combined with glycerin in naturally occurring animal and vegetable oils and fats; and (3) inner ether bonds in ratio 10 to 30 mols ethylene oxide to 1 mol of mono-fatty acid ester.

As examples of polyhydric alcohols suitable for use in carrying out the invention, any six carbon atom, aliphatic, straight chain, hexahydric alcohol may be applied, but it is preferred to use mannitol, sorbitol and dulcitol because of their availability.

Examples of fatty acid radicals which are heretofore referred to may be derived from the following fatty acids, such as stearin, whale oil, menhaden oil, neat's-foot oil, castor oil, corn oil, cottonseed oil, coconut oil, linseed oil, palm kernel oil, rapeseed oil, China-wood oil, soybean oil, sun flower oil, olive oil and the like, including fatty acids such as lauric, myristic, palmitic, oleic, linoleic, linolenic, ricinoleic, stearic, dihydroxy stearic acids and the like.

Another object is to retain the good features of fatty acid esters as emulsifying or solubilizing agents and to eliminate their disadvantages, with hexitol polyoxyethylene mono-fatty acid esters cited as an example. As stated, the manufacturers of these fatty acid esters recommend up to 85 per cent of this emulsifier to 15 per cent of essential oil. This produces all the disadvantages of bitterness and foaming as described above, which make it impractical to use this type of emulsifier for dispersing flavor oils in a great number of instances in food processing.

Five to 10 per cent is the strength of the oil flavor represented by the average emulsion or other forms of diluting these oils. By using this average strength of flavor content as a guide, this invention reduces the amount of hexitol polyoxyethylene mono-fatty acid esters necessary by as much as 90 per cent in a great many instances, and by at least 80 per cent in almost all other instances. Consequently, an 80 per cent to 90 per cent reduction in the bitterness of the fatty acid ester is effected, and the foaming property of the fatty acid ester present is reduced from 80 per cent to 90 per cent. Furthermore, since a high percentage of sugar is used as the active ingredient to produce an emulsoid or solution according to this invention, with a very low percentage of fatty acid ester, the sugar masks the bitterness of this low percentage of fatty acid ester that is used in the process. The foaming property of this relatively low percentage of fatty acid ester in the finished food products is negligible in food processing.

The sugars and sugar derivatives that have been and will hereafter be referred to are not limited to, but may include monosaccharides, disaccharides, polysaccharides, sugar alcohols and hydride derivatives thereof, celluloses, starches, dextrins, glucosides and the like. In addition to or as examples of those previously mentioned are the following, it being understood that the list is by no means intended to be exhaustive: dextrose, fructose, sucrose, maltose, lactose, galactose and more complex polyoses including, for example, glycogen, trimannose, lignocelluloses, various gums and the like; mannitol, sorbitol, dulcitol and other sugar alcohols, it being understood that the term "sugar alcohols" is used in accordance with conventional chemical nomenclature to include dehydration products or anhydrides and other derivatives where the essential alcohol structure is not altered. Dextrose, sucrose and invert sugar, because of their ready water-solubility and commercial availability at low cost, are particularly useful in this work.

Among the suitable carriers for oleoresins and essential oils, sugar syrup was selected as one that would be both economical and adaptable to food products as a vehicle for these flavoring agents. Sugar, invert sugar and hexitol polyoxyethylene mono-fatty acid esters are incompatible in all proportions without the addition of a suitable solvent for both products. They are made compatible either by dissolving the sugar in water or by adding water to the invert sugar. The ratio of their compatibility can be determined by the amount of water necessary to make a solution of the two products. Generally speaking, one part each of sugar, hexitol polyoxyethylene mono-fatty acid esters and water will produce a stable base for the type of emulsifying agent described in this invention. The amount of oil which this combination will solubilize can then be determined according to the solubility of the oil or oils in question.

Thus it is possible to determine the ratio of oleoresins or essential oils, hexitol polyoxyethylene mono-fatty acid esters, sugar and water necessary to establish a phase balance of this combination, which will produce a transparent solution or colloidal solution (emulsoid) that will remain transparent and in solution or suspension even in high dilutions of water. Each oil or combination of oils reacts differently, but by making the necessary adjustments described above, it is possible to produce a permanently stable transparent emulsoid or solution.

With the establishment of the stability, economic value, elimination of bitterness and reduction of foaming properties to a negligible degree, the many advantages of this invention become apparent to the food processors, where a uniform flavor is sought.

Because the size of the particles of the oleoresins and essential oils has been reduced to a solution or to colloidal dimensions, and remains that way in high dilutions, the manufacturer of flavored foods will get the benefit of all the flavor and thus be able to economize by using much less flavor than would be the case if ordinary gum and water emulsions were used.

If a manufacturer finds it practical to use a salt or sugar base for dispersing the flavors for his foods, an emulsoid or solution of the flavors required will eliminate the disadvantage of having the oils immediately separate and float to the top. This can be done very simply by mixing the proper amount of the emulsoid or solution developed by this invention with the sugar or salt base, just as when the straight essential oils are used, and the manufacturer is then insured against any loss of flavor, and there is a complete distribution of the flavor. When water dilutions or other liquid dilutions are made of a combination of this solution or emulsoid, after it has been mixed with a salt or sugar base, a uniformly stable emulsion is formed. The oils do not float to the top as would be the case if the ordinary method of using salt and sugar were employed as a carrier of the flavor oils.

Because of the stability of the product of this invention in the presence of electrolytes, it is particularly adaptable to the pickle and condiment industry, where salt, vinegar and brines are predominant in the processes of manufacture.

While this invention may be considered as a water in oil solution or emulsion, it also possesses an unusual characteristic of remaining in suspension in vegetable oils and mineral oils for several hours. This will provide dispersion in oil long enough for the flavor to be thoroughly distributed in those food products where oil is predominant. This is of particular advantage to the salad dressing manufacturers of certain water and oil types of French dressings, where the oil and water are prone to separate before the user at the consumer's table could pour it from the bottle and thus may produce an uneven distribution of the flavors and other ingredients in the salad dressing.

This invention has another advantage over gum and water emulsions in that the amount of sugar present serves as an anti-freeze and makes it practical to ship this type of product in cold weather.

The following table lists a few examples of the results attained by the use of this invention and demonstrates its effectiveness:

*Test No. 1*

| Combination* | Hexitol Oxyethylene Mono-Fatty Acid Esters | Invert Sugar | Water | Appearance | Microscopic Exam. | 2 Min. Centrifuge | Stability 5 Mo. later |
|---|---|---|---|---|---|---|---|
| *Per cent* 5 5 | *Per cent* 5 5 | *Per cent* 60 None | *Per cent* 30 90 | Transparent Cloudy | Perfect Solution Uneven Dispersion | No change Separated | No change. |

*Test No. 2*

| Nutmeg Oil | Hexitol Oxyethylene Mono-Fatty Acid Esters | Invert Sugar | Water | Appearance | Microscopic Exam. | 2 Min. Centrifuge | Stability 5 Mo. later |
|---|---|---|---|---|---|---|---|
| *Per cent* 10 10 | *Per cent* 10 10 | *Per cent* 54 None | *Per cent* 26 80 | Transparent Cloudy | Colloidal Dispersion Uneven Dispersion | No change Separated | No change. |

Test No. 3

| Orange Oil | Hexitol Oxyethylene Mono-Fatty Acid Esters | Invert Sugar | Water | Appearance | Microscopic Exam. | 2 Min. Centrifuge | Stability 5 Mo. later |
| --- | --- | --- | --- | --- | --- | --- | --- |
| Per cent | Per cent | Per cent | Per cent | | | | |
| 5 | 12 | 45 | 38 | Transparent | Colloidal Dispersion | No change | No change. |
| 5 | 12 | None | 83 | Cloudy | Uneven Dispersion | Separated | |

Test No. 4

| Dill Oil | Hexitol Oxyethylene Mono-Fatty Acid Esters | Invert Sugar | Water | Appearance | Microscopic Exam. | 2 Min. Centrifuge | Stability 5 Mo. later |
| --- | --- | --- | --- | --- | --- | --- | --- |
| Per cent | Per cent | Per cent | Per cent | | | | |
| 5 | 10 | 58 | 27 | Transparent | Colloidal Dispersion | No change | No change. |
| 5 | 10 | None | 85 | Cloudy | Uneven Dispersion | Separated | |

Test No. 5

| Combination† | Hexitol Oxyethylene Mono-Fatty Acid Esters | Sugar | Water | Appearance | Microscopic Exam. | 2 Min. Centrifuge | Stability 5 Mo. later |
| --- | --- | --- | --- | --- | --- | --- | --- |
| Per cent | Per cent | Per cent | Per cent | | | | |
| 5 | 5 | 45 | 45 | Transparent | Perfect Solution | No change | No change. |
| 10 | 10 | 35 | 45 | do | do | do | Do. |
| 25 | 25 | 22 | 28 | do | Colloidal Dispersion | do | Do. |
| 10 | 10 | None | 80 | Cloudy | Uneven Dispersion | Separated | Do. |

|  | Part |
| --- | --- |
| *Oleoresin capsicum | 1 |
| Oleoresin ginger | 1 |
| Oil of sage | 1 |
| Oil of coriander | 1 |
| Oil of nutmeg | 1 |

|  | Part |
| --- | --- |
| †Oleoresin capsicum | 1 |
| Oleoresin ginger | 1 |
| Oil of nutmeg | 1 |
| Oil of pimento | 1 |
| Oil of clove | 1 |

The following table lists a number of tests to demonstrate the stability of solutions and emulsoids made in accordance with this invention in the presence of electrolytes:

Test A

| 10% Solution Sodium Nitrite | Combination‡ | Appearance | Stability |
| --- | --- | --- | --- |
| 80% | 20% | Clear | Good. |

Test B

| 2% Solution Sodium Carbonate | Combination‡ | Appearance | Stability |
| --- | --- | --- | --- |
| 80% | 20% | Clear | Good. |

Test C

| 10% Solution Sodium Chloride | Combination‡ | Appearance | Stability |
| --- | --- | --- | --- |
| 80% | 20% | Clear | Good. |

Test D

| 2% Solution Sodium Hydroxide | Combination‡ | Appearance | Stability |
| --- | --- | --- | --- |
| 80% | 20% | Clear | Good. |

Test E

| 2% Solution Acetic Acid | Combination‡ | Appearance | Stability |
| --- | --- | --- | --- |
| 80% | 20% | Clear | Good. |

Test F

| 2% Solution Each of Acetic Acid Sodium Chloride | Combination‡ | Appearance | Stability |
| --- | --- | --- | --- |
| 80% | 20% | Clear | Good. |

Test G

| 95% Alcohol | Combination‡ | Appearance | Stability |
| --- | --- | --- | --- |
| 80% | 20% | Clear | Good. |

|  | Per cent |
| --- | --- |
| ‡Oleoresin capsicum | 1 |
| Oleoresin ginger | 1 |
| Oil of nutmeg | 1 |
| Oil of pimento | 1 |
| Oil of clove | 1 |
| Sugar | 45 |
| Water | 45 |
| Hexitol polyoxyethylene mono-fatty acid esters | 5 |

The present invention is not limited to any particular use of the products, and the product or products produced may be used for any purpose for which they are adaptable, such as foods, perfumes, cosmetics and other uses. By using the products and the methods disclosed, non-alcoholic perfumes and perfume bases may be produced. Among the uses of such products are perfumes generally, shaving lotions, facial creams and other creams, lotions and preparations for human use. The presence of the sugar in the product is not a disadvantage because the product is sufficiently diluted where it is to be used for cosmetic purposes to avoid any undesirable stickiness in the final material.

The use of the material in connection with oleoresins and essential oils and mixtures of them has been pointed out. An important advantage arises in connection with the use of the material of this invention in connection with these products. Its use is not limited to them. Polyoxyalkylene derivative of hexitol anhydride ester with long chain fatty acids such as hexitol polyoxyethylene mono-fatty acid esters may be used with suitable proportions of sugar or invert sugar to carry out the purposes of this invention wherever their properties constitute advantages.

It is to be understood that the solubilizers and solutions above referred to may be mixed with a dry base such as sugar or salt or combinations thereof to stabilize the evaporation of oleoresins and essential oil and combinations of them. This also has the advantage of protecting vegetable colors from discoloration and in reducing the necessary percentage of flavor or perfume oils.

The materials above referred to are cited only as examples, and the invention is not limited to the particular oleoresins and essential oils mentioned. Another example may be given for purposes of illustration. Vanillin and coumarin are other products with which the emulsoid acts as a good solubilizer. The following formula is illustrative:

8 ounces vanillin
2 ounces coumarin
8 ounces hexitol polyoxyethylene mono-fatty acid esters
40 ounces sugar
Water to make 1 gallon This produces an 8-fold imitation vanilla flavor. If 1 pint of this material be added to 7 pints of water, 1 gallon of single strength artificial vanilla flavoring is produced. Tests have shown that when this material is frozen and remelted, the vanillin and coumarin will go back into solution and the original, clear diluent solution is re-established.

The use of a relatively small quantity of hexitol polyoxyethylene mono-fatty acid esters and a relatively small quantity of edible alcohols such as propylene glycol in combination with essential oils, oleoresins or dry aromatics will produce finished products that are soluble in water in any proportions, without producing a cloud. The following formula is cited as an example:

8 ounces vanillin
2 ounces coumarin
16 ounces hexitol polyoxyethylene mono-fatty acid esters
32 ounces propylene glycol
Water to make 1 gallon If the hexitol polyoxyethylene mono-fatty acid esters were not used in the above formula, the resultant mixture would cloud upon the addition of a very small amount of water, whereas the addition of the hexitol polyoxyethylene monofatty acid esters produces a finished product which remains clear when diluted with water in any proportions.

The solubilizers also produce satisfactory results with dry aromatics generally when they are mixed with other products for seasoning. Examples of this are artificial maple flavor sold under the name of "Cyclotene" and burnt sugar flavor sold under the name of "Palatone." The hexitol polyoxyethylene mono-fatty acid esters acts with these products and with other products as a fixative to reduce evaporation of the flavors. When the hexitol polyoxyethylene mono-fatty acid esters mixed with other flavors is put into dry products, such, for example, as animal feed, it remains moist for a long while and prevents evaporation of the flavoring material.

An example of this use of hexitol polyoxyethylene mono-fatty acid esters is as follows: Mix 5 per cent to 10 per cent of a finished flavor containing hexitol polyoxyethylene mono-fatty acid esters prepared according to the method above set out with a salt or sugar base or combination thereof, and use approximately 8 ounces of finished product to flavor 100 pounds of finished food product.

I claim:

1. The process of producing solutions which includes the following steps: mixing a quantity of oleoresinous material with a quantity of hexitol polyoxyethylene mono-fatty acid esters, a quantity of sugar and a quantity of water, the hexitol polyoxyethylene mono-fatty acid esters comprising less than 15 per cent of the total quantity, the oleoresinous material comprising not less than 5 per cent of the total quantity of the material, and the sugar comprising not more than 60 per cent of the total quantity of material.

2. The process of producing solutions which includes the following steps: mixing a quantity of essential oil with a quantity of hexitol polyoxyethylene mono-fatty acid esters, a quantity of sugar and a quantity of water, the essential oil comprising not less than 5 per cent of the total quantity of the material, the hexitol polyoxyethylene mono-fatty acid esters comprising less than 15 per cent of the total quantity, and the sugar comprising not more than 60 per cent of the total quantity of material.

3. The process of producing solutions which includes the following steps: mixing a quantity of oleoresinous material with a quantity of hexitol polyoxyethylene mono-fatty acid esters, a quantity of invert sugar and a quantity of water, the hexitol polyoxyethylene mono-fatty acid esters comprising approximately 5 per cent of the total quantity of material, the oleoresinous material comprising approximately 5 per cent of the total material and the invert sugar comprising approximately 60 per cent of the total quantity of material.

4. The process of producing an emulsoid which comprises the following steps: mixing approximately 10 per cent of nutmeg oil with approximately 10 per cent of hexitol polyoxyethylene mono-fatty acid esters, approximately 54 per cent of invert sugar and approximately 26 per cent of water.

5. The process of producing an emulsoid which comprises the following steps: mixing approximately 5 per cent of orange oil with approximately 12 per cent of hexitol polyoxyethylene mono-fatty acid esters, approximately 45 per cent of invert sugar and approximately 38 per cent of water.

6. The process of producing an emulsoid which comprises the following steps: mixing approximately 5 per cent of dill oil with approximately 10 per cent of hexitol polyoxyethylene mono-fatty acid esters, approximately 58 per cent of invert sugar and approximately 27 per cent of water.

7. A liquid material comprising a composition including 5 per cent of hexitol polyoxyethylene mono-fatty acid esters, 5 per cent of oleoresin, 60 per cent of invert sugar and 30 per cent of water.

8. A liquid material comprising a composition including 5 per cent of hexitol polyoxyethylene mono-fatty acid esters, 5 per cent of essential oil, 60 per cent of invert sugar and 30 per cent of water.

9. A liquid material comprising a composition including 10 per cent of hexitol polyoxyethylene mono-fatty acid esters, 10 per cent nutmeg oil, 54 per cent of invert sugar and 26 per cent of water.

10. A liquid material comprising a composition including 5 per cent orange oil, 12 per cent hexitol oxyethylene mono-fatty acid esters, 45 per cent invert sugar and 38 per cent of water.

11. A liquid material comprising a composition including 10 per cent hexitol polyoxyethylene mono-fatty acid esters, 5 per cent of dill oil, 58 per cent of invert sugar and 27 per cent of water.

12. A clear liquid material comprising hexitol polyoxyethylene mono-fatty acid esters, water, sugar and additional flavoring material, the hexitol polyoxyethylene mono-fatty acid esters being present in an amount not exceeding 15% of the total quantity, the sugar being present in an amount not exceeding 60% of the total quantity, and the additional flavoring material being present in an amount not less than 5% of the total quantity of the material.

13. The process of producing solutions which includes the following steps: mixing a quantity of hexitol polyoxyethylene mono-fatty acid esters, a quantity of sugar, a quantity of water, and a quantity of additional flavoring material, the hexitol polyoxyethylene mono-fatty acid esters comprising less than 15% of the total quantity, the sugar comprising not more than 60% of the total quantity, and the additional flavoring material comprising not less than 5% of the total quantity of the material.

TALMADGE B. TRIBBLE.

REFERENCES CITED

The following references are of record in the file of this patent:

UNITED STATES PATENTS

| Number | Name | Date |
| --- | --- | --- |
| 1,384,681 | Smith et al. | July 12, 1921 |
| 1,403,473 | Albach et al. | Jan. 17, 1922 |
| 1,500,670 | De Groote | July 8, 1924 |
| 2,422,145 | Taylor | June 10, 1947 |
| 2,422,486 | Johnston | June 17, 1947 |